United States Patent
Kuwata et al.

(10) Patent No.: US 7,502,566 B2
(45) Date of Patent: Mar. 10, 2009

(54) LIGHT-EMITTING MODULE

(75) Inventors: Yasuaki Kuwata, Kanagawa (JP);
Hideo Nakayama, Kanagawa (JP);
Akemi Murakami, Kanagawa (JP);
Ryoji Ishii, Kanagawa (JP); Naotaka Mukoyama, Kanagawa (JP)

(73) Assignee: Fuji Xerox, Co., Ltd., Tokyo (JP)

( * ) Notice: Subject to any disclaimer, the term of this patent is extended or adjusted under 35 U.S.C. 154(b) by 477 days.

(21) Appl. No.: 11/319,702

(22) Filed: Dec. 29, 2005

(65) Prior Publication Data

US 2007/0019960 A1    Jan. 25, 2007

(30) Foreign Application Priority Data

Jul. 20, 2005    (JP)    ............................. 2005-209400

(51) Int. Cl.
*H04B 10/12*    (2006.01)
*H04B 10/00*    (2006.01)

(52) U.S. Cl. .................. 398/182; 398/138; 398/164; 398/197; 398/201; 398/212; 372/50.21; 372/50.23

(58) Field of Classification Search .............. 398/182, 398/164, 197, 210, 135–136, 138–141, 212, 398/214; 372/6, 23, 43.01, 50.121, 50.21, 372/50.23

See application file for complete search history.

(56) References Cited

U.S. PATENT DOCUMENTS

| 7,072,543 | B2 * | 7/2006 | Pierce et al. ................... 385/28 |
| 7,251,262 | B2 * | 7/2007 | Kuwata ................. 372/50.124 |
| 2002/0126356 | A1 * | 9/2002 | Nakanishi et al. ........... 359/163 |
| 2004/0175186 | A1 * | 9/2004 | Tabata ........................ 398/141 |

FOREIGN PATENT DOCUMENTS

| JP | 11-274650 | * 10/1999 |
| JP | A 11-274650 | 10/1999 |
| JP | A 2001-343559 | 12/2001 |
| JP | A 2004-95824 | 3/2004 |

* cited by examiner

*Primary Examiner*—M. R. Sedighian
(74) *Attorney, Agent, or Firm*—Oliff & Berridge, PLC

(57) ABSTRACT

A light-emitting module outputting laser beam emitted from a semiconductor light-emitting element via a lens, the light-emitting module includes a first main plane, a mount portion on the first main plane that mounts the semiconductor light-emitting element, a lens holding portion that holds the lens so that a light axis of the lens corresponds to a reference line crossed at right angles to the first main plane, a semiconductor light-receiving element that receives the laser beam reflected by the lens out of the laser beam emitted from the semiconductor light-emitting element. The semiconductor light-receiving element is positioned on the light axis of the lens and the semiconductor light-emitting element is provided away from the light axis of the lens.

18 Claims, 11 Drawing Sheets

LIGHT-EMITTING MODULE

BACKGROUND OF THE INVENTION

1. Field of the Invention

This invention relates to a light-emitting module that emits lights received from a semiconductor light-emitting element such as a semiconductor laser element or the like via a lens, and more particularly, to a technique of monitoring an optical output from the semiconductor light-emitting element.

2. Description of the Related Art

A vertical cavity surface emitting laser diode (hereinafter referred to as VCSEL) is a laser diode that emits lights from a plane of a semiconductor substrate. VCSEL has several characteristics: VCSEL is lower in the drive current than that of an edge-emitting laser diode, the characteristic test can be performed at a wafer level, and can be readily produced into a two-dimensional array. Therefore, VCSEL is in use as a light source for optical information processing or optical communication, or as a light source of a data memory apparatus that stores data by means of light.

Generally, VCSEL is used with hermetically sealed in a package according to the standard TO-CAN packaging or the like. The package includes a lead pin for external connection. A drive signal applied to the lead pin is converted into an optical signal, and a laser beam is emitted from the package. Such emitted optical output varies depending on the temperature or the like. Hence, the optical output of VCSEL is monitored, and the drive current is controlled according to the monitoring result.

Japanese Patent Application Publication No. 2001-343559 (hereinafter, referred to as Document 1), as illustrated in FIG. 16, describes an optical module that includes, on a substrate 1, a light-emitting element 3, an optical fiber 5 optically coupled to the light-emitting element 3, a light-receiving element 4 that monitors the light emitted from the light-emitting element 3. A partially transmitting mirror 8 is also included to partially reflect the light emitted from the light-emitting element 3 and transmitted in the optical fiber 5 across a core axis 5a of the optical fiber 5 in non-parallel directions relative to the core axis 5a, and the light-receiving element 4 monitors the light reflected from the partially transmitting mirror 8.

A light-emitting module 10 described in Japanese Patent Application Publication No. 2004-95824 (hereinafter, referred to as Document 2), as illustrated in FIG. 17, includes a mount element 20 that mounts a semiconductor light-emitting element 21 and a semiconductor light-receiving element 22 such as a VCSEL or the like, a lens 32, and a lens-holding member 30. The light emitted from the semiconductor light-emitting element 21 is partially reflected by a reflection film 32c provided on a first plane 32a of the lens 32, and enters into the semiconductor light-receiving element 22. This makes it possible to receive front surface lights emitted from the semiconductor light-emitting element with the semiconductor light-receiving element without a half mirror.

Japanese Patent Application Publication No. 11-274650 (hereinafter, referred to as Document 3), as illustrated in FIG. 18A, a VCSEL 19 is arranged to face a glass window 8. A photo diode 2 mounted on a PD submount 4 is, as illustrated in FIG. 18B, includes a light-receiving plane having a shape of ring in which a through hole 17 is formed in the center thereof. The through hole 17 formed in the photo diode 2 is provided to partially pass only the light that includes a light axis of a mainly emitted light 12 of the laser diode 19, and only the light that passes through the through hole 17 is externally emitted through the glass 8. A higher-order light emitted at a high angle out of the mainly emitted light 12 is radiated by the photo diode 2 having a shape of ring, and is blocked.

As described heretofore, a ball lens is held as a light-emitting module in which the laser beam emitted from VCSEL is coupled to an optical fiber via a lens, thereby realizing an optical coupling with the optical fiber with a comparatively small part number. There is an advantage in that the fabrication cost is low. On the other hand, as shown in Document 2, the semiconductor light-emitting element is disposed on the light axis of the ball lens and the photodiode is arranged in a position away from the semiconductor light-emitting element. When a light amount of the semiconductor light-emitting element is monitored, there is a disadvantage that a use efficiency of the light amount reflected by the ball lens is low. In particular, when the laser beams emitted from the semiconductor light-emitting element are multi-mode ones, the light-emitting intensity is distributed in a doughnut shape. For this reason, unless the photo diode is aligned with high accuracy, the coupling efficiency with the reflected beam will be degraded. If the laser light amount is increased to enter a light amount enough to operate the photo diode, which is not desirable in light of operating life and safety of the semiconductor light-emitting element such as VCSEL or the like. In addition, the monitoring method described in Document 1 has to include the half mirror provided separately from the lens, leading to a problem of increased costs. In the monitoring method described in Document 3, the light-receiving element partially blocks the laser beam. This completely lacks a light-emitting pattern, and this is not desirable in the optical communication.

SUMMARY OF THE INVENTION

The present invention has been made in view of the above circumstances and provides a light-emitting module that is capable of enhancing a use efficiency of the light emitted from the lens and monitoring a light amount of the laser beam without increasing the light amount of the emitted laser beam.

According to one aspect of the present invention, there is provided a light-emitting module outputting laser beam emitted from a semiconductor light-emitting element via a lens, the light-emitting module including: a first main plane; amount portion on the first main plane that mounts the semiconductor light-emitting element; a lens holding portion that holds the lens so that a light axis of the lens corresponds to a reference line crossed at right angles to the first main plane; a semiconductor light-receiving element that receives the laser beam reflected by the lens out of the laser beam emitted from the semiconductor light-emitting element. The semiconductor light-receiving element may be positioned on the light axis of the lens and the semiconductor light-emitting element is provided away from the light axis of the lens.

According to another aspect of the present invention, there is provided an optical transmission apparatus including the above-mentioned light-emitting module; and a transmission portion that transmits laser beam output from the light-emitting module through an optical fiber.

According to another aspect of the present invention, there is provided a free space optical transmission apparatus including: the above-mentioned light-emitting module; and a transmission portion that transmits laser beam transmitted from the light-emitting module through free space.

According to another aspect of the present invention, there is provided an optical transmission system including: the above-mentioned light-emitting module; and a transmission portion that transmits laser beam transmitted from the light-emitting module.

According to another aspect of the present invention, there is provided a free space optical transmission system including: the above-mentioned light-emitting module; and a transmission portion that transmits laser beam transmitted from the light-emitting module through free space.

BRIEF DESCRIPTION OF THE DRAWINGS

Embodiments of the present invention will be described in detail based on the following figures, wherein.

DESCRIPTION OF THE EMBODIMENTS

A description will now be given, with reference to the accompanying drawings, of embodiments of the present invention.

Embodiments

Figure 1A:
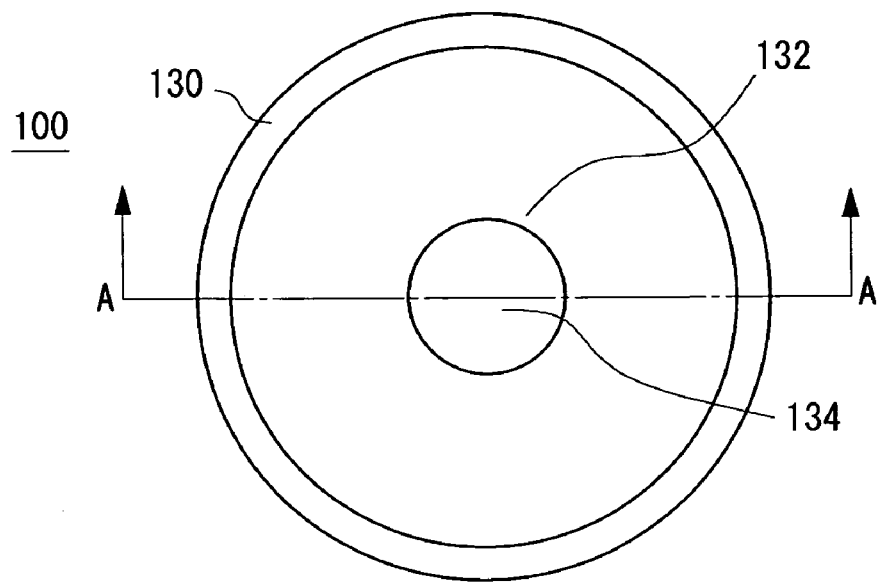
FIGS. 1A and 1B are cross-sectional views showing a schematic configuration of a light-emitting module in accordance with a first embodiment of the present invention.
Figure 1B:
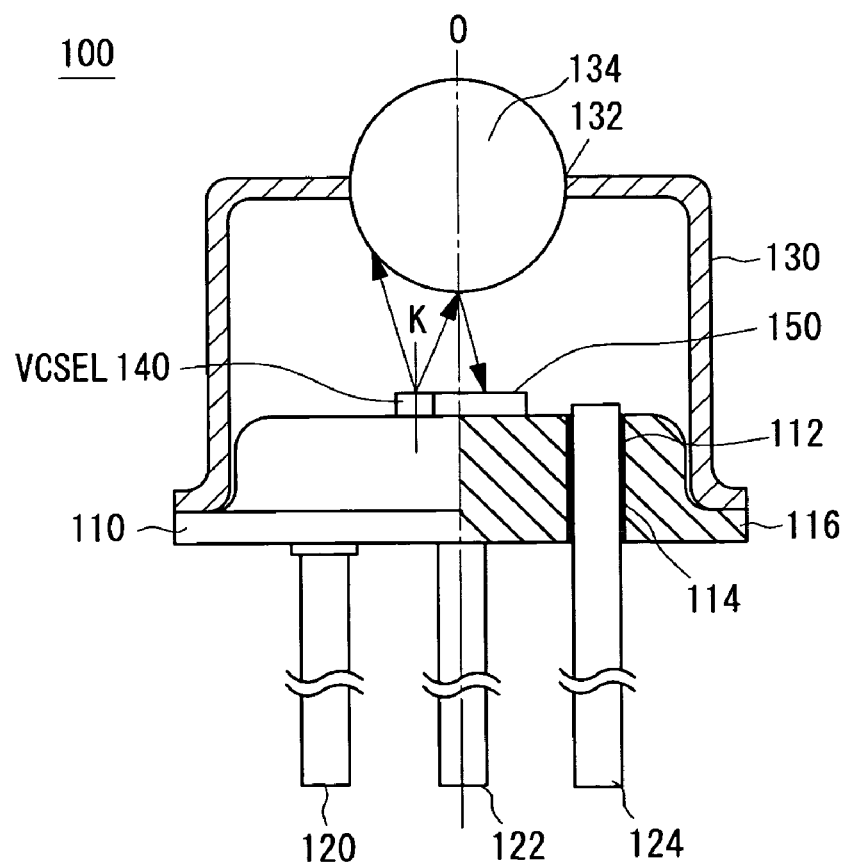

FIGS. 1A and 1B are cross-sectional views showing a schematic configuration of a light-emitting module in accordance with a first embodiment of the present invention. A light-emitting module 100 in accordance with the present embodiment includes a metal stem 110, multiple lead pins 120, 122, and 124, and a metal cap 130. The metal stem 110 mounts a VCSEL chip. The multiple lead pins 120, 122, and 124 protrude from a backside of the stem 110. The metal cap 130 is attached to the stem 110.

Through holes 112 are provided in the stem 110 to attach the multiple lead pins 120, 122, and 124. An insulating film 114 is filled in an inner surface of the through hole 112 in order to electrically insulate the lead pins 120, 122, and 124 to be inserted. A VCSEL chip 140 and a semiconductor light-receiving element 150 of photo diode or the like, which is adjacently arranged thereto, are mounted on a plane of the stem 110. The lead pin 120 is an earth terminal and provided common to an n-side electrode of the VCSEL chip 140 and a ground electrode of the semiconductor light-receiving element 150. The lead pin 122 is electrically coupled to a p-side electrode of the VCSEL chip 140 to supply the drive current to the VCSEL 140. The lead pin 124 is connected to an output terminal of the semiconductor light-receiving element 150. The lead pins 120, 122, and 124 are coupled to desired electrode pads, for example, by wire bonding, at ends thereof.

A flange 116 having a shape of ring is formed in an outer peripheral of the stem 110. A cap 130 is attached to the flange 116 by welding or the like. The cap 130 has a shape of cylinder, and an output window 132 having a shape of circle is provided on a top thereof. A ball lens 134 is held in the output window 132, so an internal space is sealed by the cap 130 and the stem 110.

Figure 2:
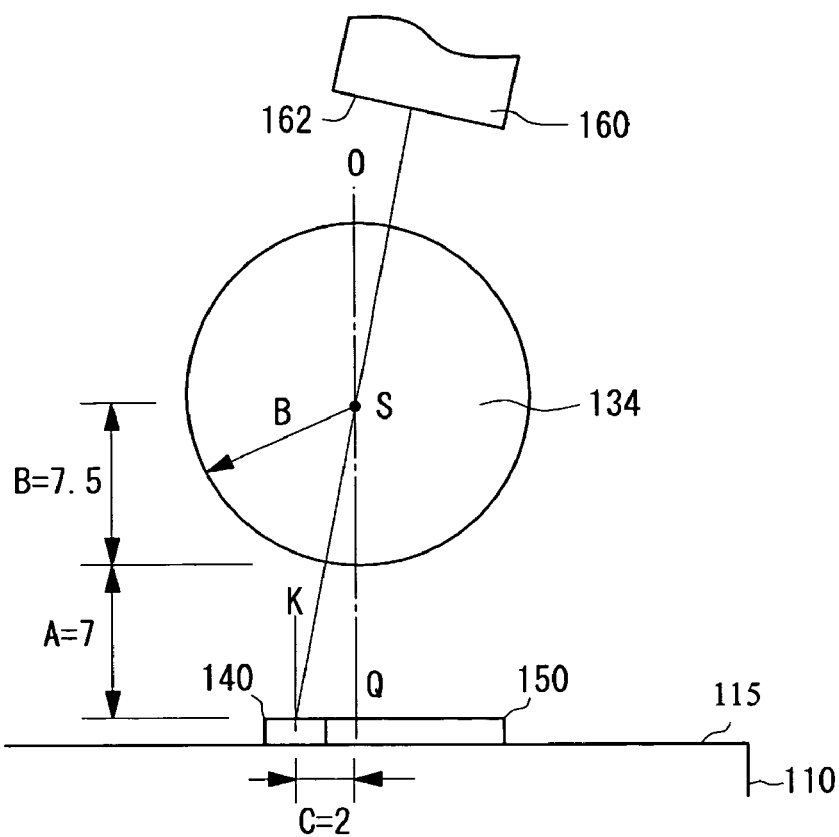
FIG. 2 is a view illustrating an arrangement of a VCSEL chip and a semiconductor light-receiving element.

FIG. 2 is a view illustrating an arrangement of the VCSEL chip and the semiconductor light-receiving element. The stem 110 includes a plane surface 115 at least to dispose the VCSEL chip 140 and the semiconductor light-receiving element 150 thereon. The VCSEL chip 140 and the semiconductor light-receiving element 150 are bonded onto the surface 115 by a die attach material, for example. At this time, the VCSEL chip 140 and the semiconductor light-receiving element 150 may be arranged closely enough to get in touch with each other. A center S of the ball lens 134 is arranged in a direction that corresponds to a reference line Q crossed at right angles to the surface 115. A light axis O of the ball lens 134 is defined as a line connecting the reference line Q and the center S of the ball lens 134. The position of the reference line Q is not limited in particular, yet it is desirable that the reference line Q be provided in the center or near the center of the output window 132.

In accordance with the present embodiment, a characteristic aspect is that the semiconductor light-receiving element 150 is arranged on the light axis O of the ball lens 134, and the VCSEL chip 140 is offset in a horizontal direction from the light axis O. An offset amount from the center of a light-emitting portion of the VCSEL chip 140, namely, from a light axis K may be equal to or less than a distance of a radius of the ball lens 134. In addition, a relationship of approximately A:B:C=7:7.5:2 is satisfied, where A is a distance from the lowermost face of the ball lens 134 to the surface 115 thereof, B is a radius of the ball lens, and C is a distance from the light axis K of the VCSEL chip 140 to the light axis O of the ball lens.

Figure 3:
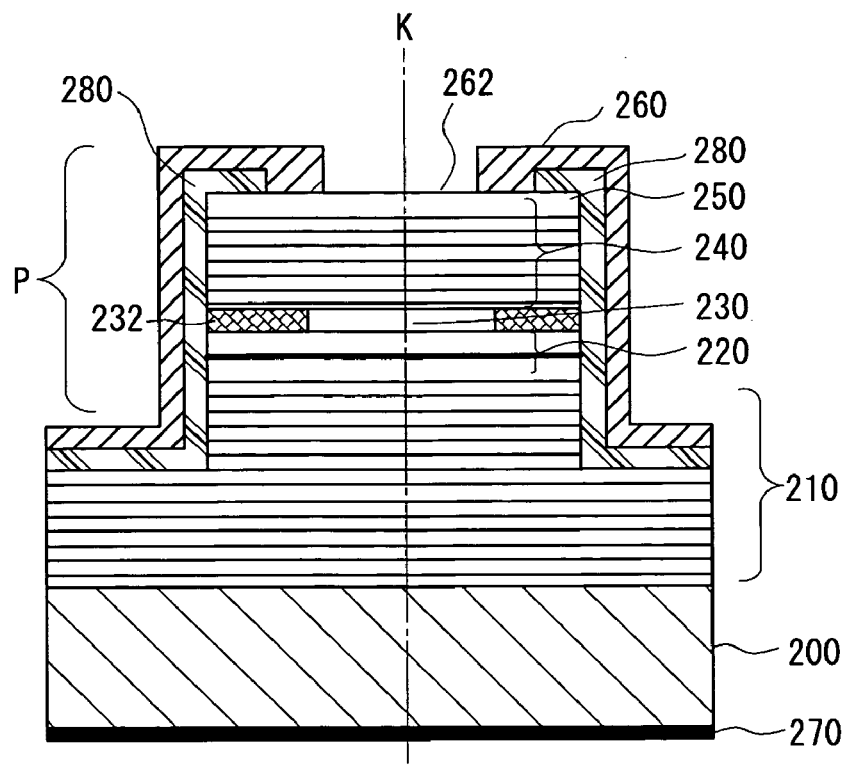
FIG. 3 is a cross-sectional view showing a configuration of the VCSEL chip.

FIG. 3 is a cross-sectional view showing a configuration of the VCSEL chip. The VCSEL chip 140 includes, successively on an n-type GaAs substrate 200, a lower multi-layered reflection film 210 of a laminated body having multiple layers that include n-type $Al_{0.8}Ga_{0.2}As$ layers and n-type $Al_{0.1}Ga_{0.9}As$ layers, an active region 220 of a laminated body that includes a spacer layer of undoped $Al_{0.4}Ga_{0.6}As$ layer, a barrier layer of undoped $Al_{0.2}Ga_{0.8}As$ layer, and a quantum well layer of undoped GaAs layer, a p-type AlAs layer 230, an upper multi-layered reflection film 240 of a laminated body that includes multiple p-type $Al_{0.8}Ga_{0.2}As$ layers and p-type $Al_{0.1}Ga_{0.9}As$ layers, a contact layer 250 of a p-type GaAs layer, a p-side upper electrode 260 that establishes an ohmic contact with a contact layer 250, and an n-side electrode 270 formed on a backside of the substrate.

A post P is formed on the substrate 200, and a sidewall and a bottom of the post P are covered with an interlayer insulating film 280. An oxidized region 232 is provided in an outer peripheral of the AlAs layer 230, and the AlAs layer 230 serves as a current funneling layer so as to confine the current. In addition, an emission aperture 262 is provided for emitting the laser beam in the center of the upper electrode 260. An emitted light having a wave length of 850 nm is obtainable from the active region 220 with the above-described configuration.

Figure 4:
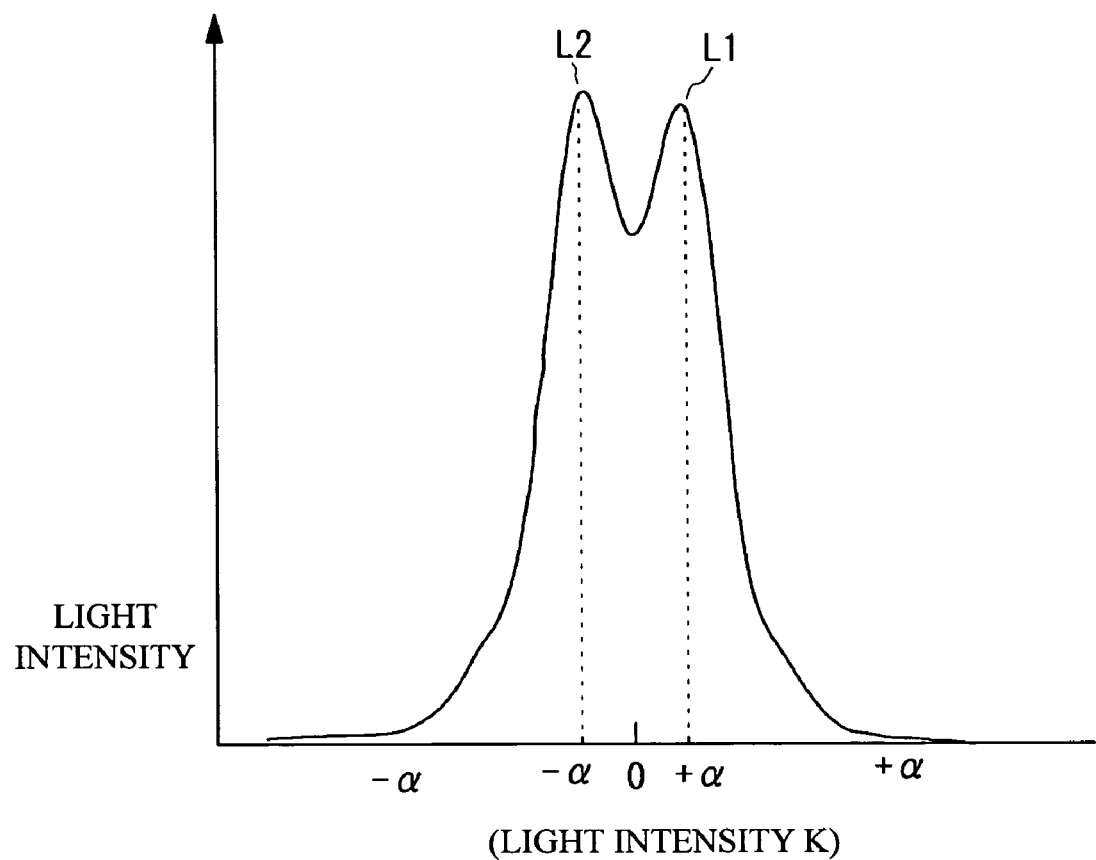
FIG. 4 is a view showing a light-emitting intensity of multimode light emitted by the VCSEL chip.

Next, a description will be given of an operation of a light-emitting module. When the drive current is applied to the lead pins 120 and 122, the laser beam is emitted from the emission aperture 262 in a direction of the light axis K, which runs vertically to the substrate (see FIG. 3). If the laser beam is a multi-mode one, the typical light-emitting intensity is shown in FIG. 4. The laser beam is emitted at a beam divergence angle ranging from $-\alpha$ to $+\alpha$ a centering on the light axis K. The light-emitting intensity has a profile, which degrades in a direction of the light axis K and has a doughnut or diphasic shape having peak values L1 and L2 on both sides thereof. That is to say, the multi-mode light has peak intensities at given angles $(+\alpha 1, -\alpha 1)$ from the light axis K.

The laser beam emitted from the VCSEL 140 is partially incident to the ball lens 134, and is partially reflected. The VCSEL 140 is offset from the light axis O of the lens, yet with the ball lens 134, the beam incident to the ball lens 134 is focused onto an incident edge 162 of the optical fiber 160, as exemplarily shown in FIG. 2, even if the laser beam is incident from an oblique direction in some degree.

The light reflected by the ball lens 134 roughly travels to a direction of the light axis O, and is received by the semiconductor light-receiving element 150. In the present embodiment, the semiconductor light-receiving element 150 is arranged on the light axis O. This makes a light path length the shortest, increases a received light amount of the reflected light, as will be described later, and improves the detection more accurately than ever before.

Figure 5:
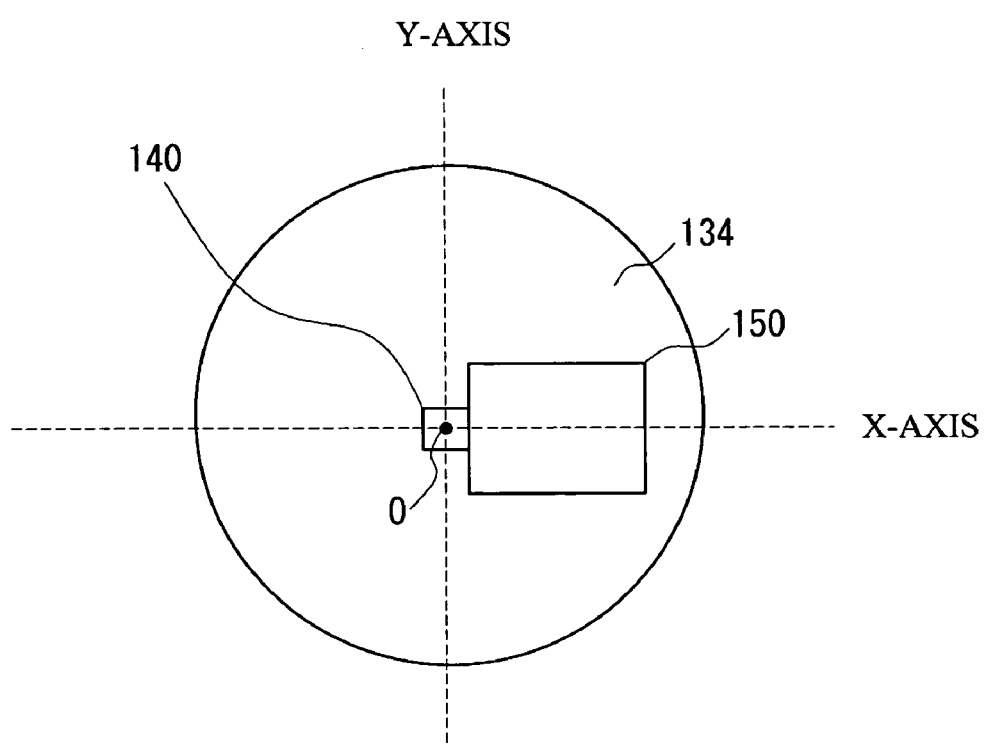
FIG. 5 is a plan view showing a ball lens from the top.
Figure 6A:
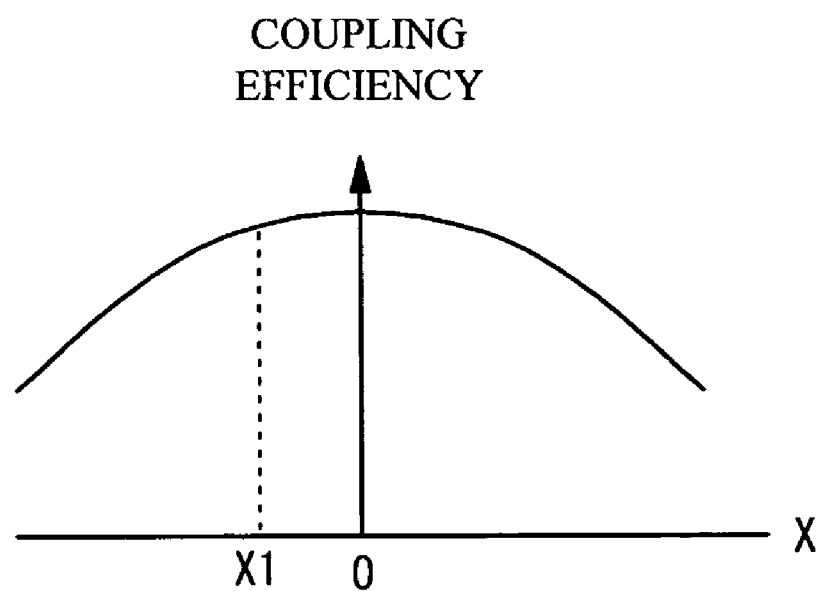
FIG. 6A shows a coupling efficiency of the semiconductor light-receiving element.
Figure 6B:
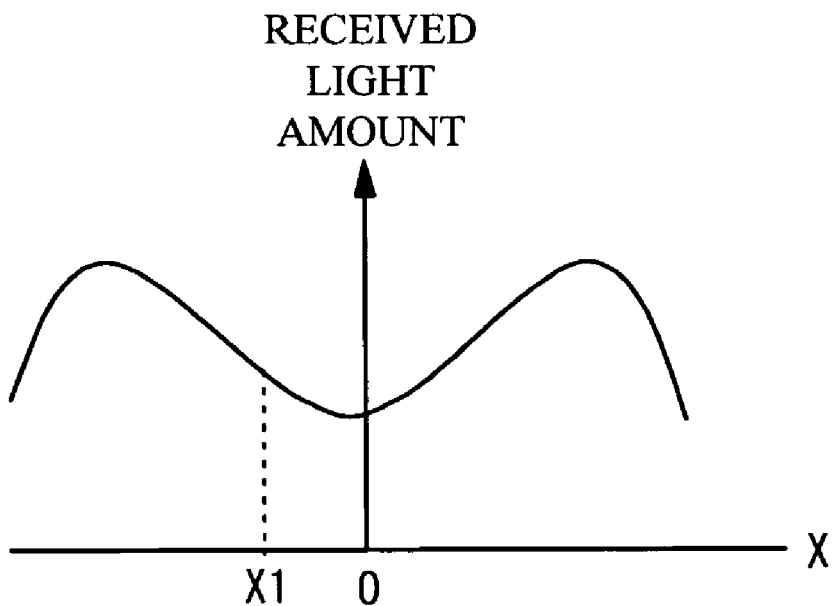
FIG. 6B shows a received light amount of the semiconductor light-receiving element.

FIG. 5 is a plan view showing the ball lens from the top. The light axis O is arranged at an intersection of X-axis and Y-axis. The center of a luminous point of the VCSEL chip is arranged on the intersection. The semiconductor light-receiving element 150 is disposed adjacently to the VCSEL chip 140. FIG. 6A shows a coupling efficiency in an X-axis direction shown in FIG. 5. FIG. 6B shows the received light amount in an X-axis direction shown in FIG. 5. When both the light axis of the ball lens and that of the optical fiber are arranged to correspond to the light axis O and the luminous point of the VCSEL chip is moved on the X-axis so as to pass the intersection of the X-axis and the Y-axis, the coupling efficiency of the light emitted from the ball lens and the optical fiber is, as shown in FIG. 6A, the light axis O comes to have a peak value and the coupling efficiency is degraded as the luminous point of the VCSEL chip becomes away from the light axis O in an X-axis direction. The received light amount of the semiconductor light-receiving element 150 adjacent to the VCSEL chip, as shown in FIG. 6B, has a negative peak value on the light axis O and a positive peak value as it becomes away in the X-axis direction. This is because a light-emitting profile of multimode beam is reflected. In this manner, the coupling efficiency tends to decrease as the luminous point comes away from the light axis O. In contrast, the received light amount tends to increase to a given distance. In the present embodiment, the VCSEL chip 140 and the semiconductor light-receiving element 150 are shifted to a position X1 in the X-axis direction to obtain a 10 percent increase in the received light amount while the decrease in the coupling efficiency is suppressed to 3 percent. Accordingly, the relationship of A:B:C=7:7.5:2 is obtained, as described above. Thus, the semiconductor light-receiving element 150 is arranged on the light axis O and the VCSEL chip 140 is offset from the light axis O by the distance X1 only.

Figure 7:
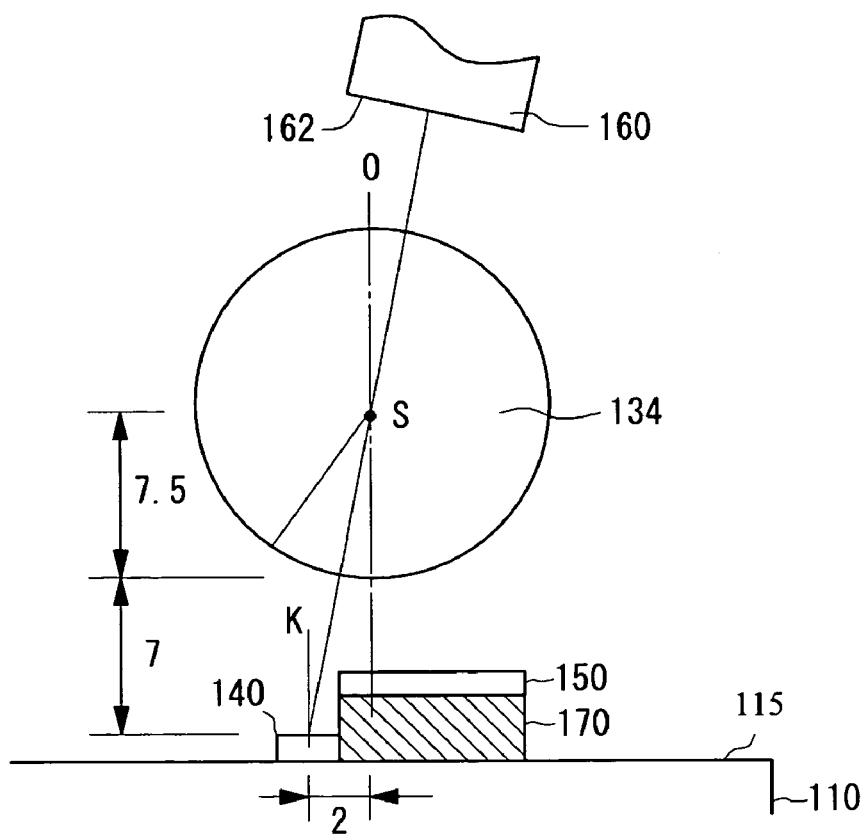
FIG. 7 is a cross-sectional view showing a schematic configuration of a light-emitting module in accordance with a second embodiment of the present invention.

Next, a description will be given of a second embodiment of the present invention. FIG. 7 shows a light-emitting module in accordance with a second embodiment. Hereinafter, in the second embodiment, the same components and configurations as those of the first embodiment have the same reference numerals and a detailed explanation will be omitted. In the second embodiment, the semiconductor light-receiving element 150 is provided on a mounting member 170 of a mounter or the like. The semiconductor light-receiving element 150 is offset from the surface 115 of the stem 110 by means of the mounting member 170. A light-receiving surface of the semiconductor light-receiving element 150 is arranged higher than a light-emitting surface of the VCSEL chip 140. This makes the light-receiving surface much closer to the reflection surface of the ball lens 134, making it possible to increase the light-receiving intensity of the semiconductor light-receiving element 150. Also in the first embodiment, the semiconductor light-receiving element 150 is provided on the light axis O. The light path length becomes the shortest, and the light-receiving intensity is enhanced. However, the light-receiving intensity can be further enhanced, as exemplified in the second embodiment, by vertically offsetting the light-receiving surface by a length as long as a height of the mounting member 170. Also in the second embodiment, it is desirable to set A:B:C=7:7.5:2.

Figure 8:
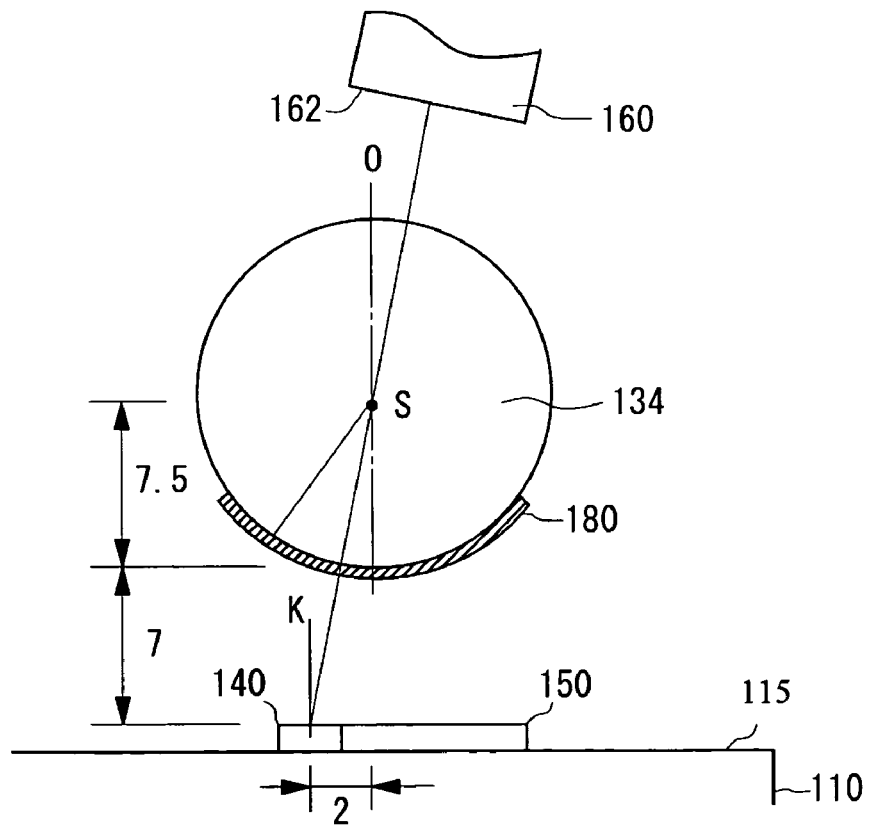
FIG. 8 is a cross-sectional view showing a schematic configuration of a light-emitting module in accordance with a third embodiment of the present invention.

A description will now be given of a third embodiment of the present invention. FIG. 8 shows a light-emitting module in accordance with the third embodiment of the present invention. Hereinafter, in the second embodiment, the same components and configurations as those of the first embodiment have the same reference numerals and a detailed explanation will be omitted. In the third embodiment, a reflection film 180 is provided on a surface that faces the VCSEL chip of the ball lens 134. The reflection film 180 may have a reflection coefficient in such a manner that the laser beam emitted from the VCSEL chip is partially reflected and partially transmitted. In the same manner, in accordance with the second embodiment, the reflection film 180 may be provided on the ball lens 134.

Figure 9A:
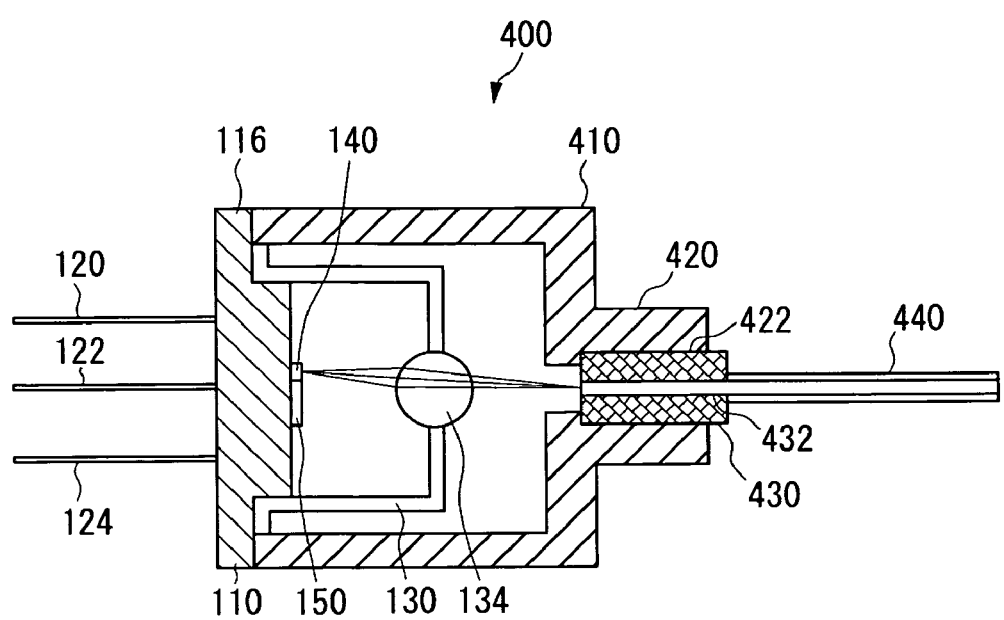
FIG. 9A is a cross-sectional view showing a configuration in which the light-emitting module is applied to an optical transmission apparatus.
Figure 9B:
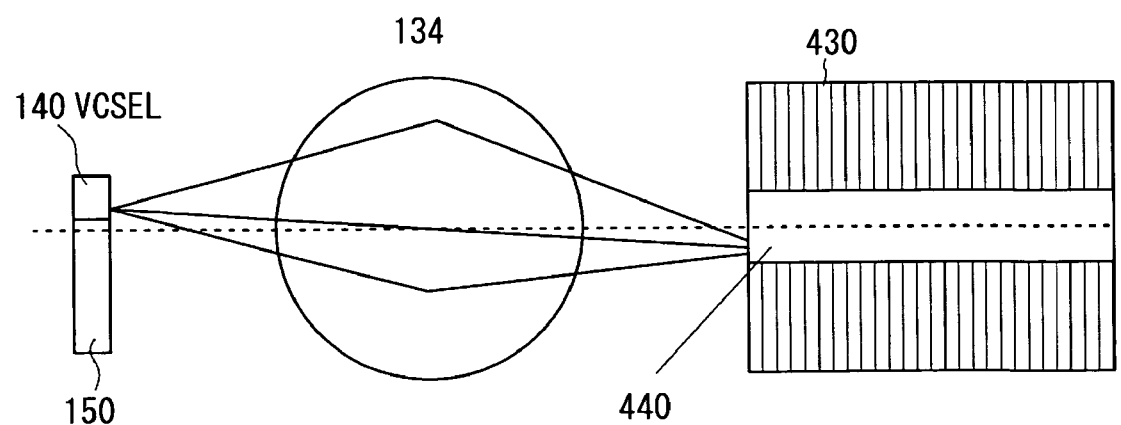
FIG. 9B is a view illustrating an optical system shown in FIG. 9A.

Next, a description will be given of an optical transmission apparatus that employs the light-emitting module in accordance with the present invention. FIG. 9A is a cross-sectional view showing a configuration in which the light-emitting module shown in FIGS. 1A and 1B is applied to the optical transmission apparatus. An optical transmission apparatus 400 includes a chassis 410 having a cylindrical shape, a sleeve 420, a ferrule 430, and an optical fiber 440. The chassis 410 is fixed to the stem 110. The sleeve 420 is integrally formed with an end surface of the chassis 410. The ferrule 430 is retained in an opening 422 of the sleeve 420. The optical fiber 440 is retained by the ferrule 430. FIG. 9B is a view illustrating an optical system thereof.

An end of the chassis 410 is fixed to the flange 116 formed in a circumferential direction of the stem 110. The ferrule 430 is accurately positioned in the opening 422 of the sleeve 420, and the light axis of the optical fiber 440 is aligned to the light axis of the ball lens 134. A core of the optical fiber 440 is retained in a through hole 432 of the ferrule 430.

As shown in FIG. 9B, the laser beam emitted from the VCSEL chip 140 is partially condensed by the ball lens 134. Such condensed light is incident to the core of the optical fiber 440, and is transmitted.

In the above-described example, the light axis of the optical fiber 440 is aligned to the light axis O of the lens, however, as shown in FIG. 2, FIG. 7, or FIG. 8, the incidence plane 162 of the optical fiber 160 may be tilted so that the light having the peak intensity emitted from the VCSEL chip 140 at a given angle can be incident vertically. That is to say, the light axis of the optical fiber 160 is tilted at a given angle from the light axis O of the lens. This makes it possible to further improve an incident coupling efficiency of the laser beam of the optical fiber 160.

The semiconductor light-receiving element 150 outputs an electronic signal from the lead pin 124 according to the light amount reflected by the ball lens 134. In response to this, the drive signal, which is controlled to obtain a constant light-emitting amount of the VCSEL 140, is supplied to the lead pins 120 and 122.

The optical transmission apparatus 400 may include a drive control circuit to be provided for applying the drive signal to the VCSEL chip 140. In this case, the drive control circuit is capable of controlling the drive signal applied to the VCSEL, on the basis of an output signal from the semiconductor light-receiving element 150.

Figure 10:
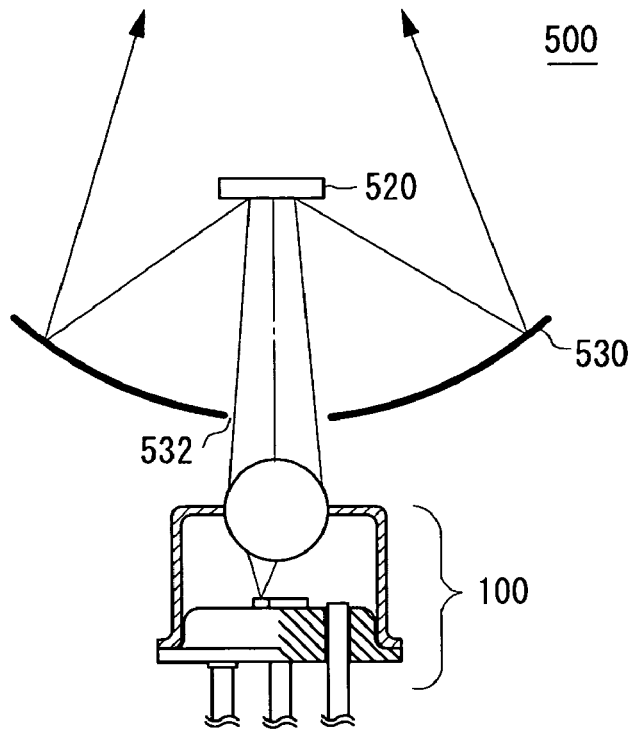
FIG. 10 is a view showing a configuration in which the light-emitting module is in use for a free space optical transmission system.

FIG. 10 is a view showing a configuration in which the light-emitting module shown in FIGS. 1A and 1B is in use for a free space optical transmission system. A free space transmission system 500 includes a light-emitting module 100, a diffuser 520, a reflection mirror 530. In the free space transmission system 500, the light condensed by the ball lens 134 of the light-emitting module 100 is reflected by the diffuser 520 via an opening 532 of the reflection mirror 530, and is further is reflected towards the reflection mirror 530. The reflection mirror 530 reflects such reflected light to a given direction for an optical transmission. The VCSEL of multi-spot type is used as a light source of the free space transmission to obtain a high output.

Figure 11:
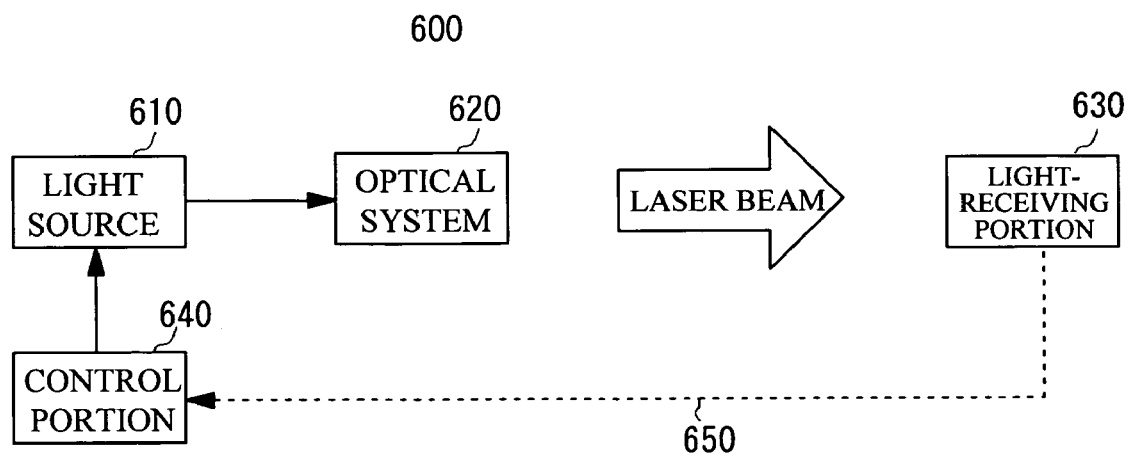
FIG. 11 is a block diagram of an optical transmission system.

FIG. 11 is a view showing a configuration example of an optical transmission system in which VCSEL is in use for a light source. An optical transmission system 600 includes a light source 610, an optical system 620, a light-receiving portion 630, and a controller 640. The light source 610 includes the VCSEL chip 140. The optical system 620 condenses the laser beam emitted from the light source 610. The light-receiving portion 630 receives the laser beam emitted from the optical system 620. The controller 640 controls to drive the light source 610. The controller 640 supplies drive pulse signals for driving the VCSEL to the light source 610. The light emitted from the light source 610 is transmitted to the light-receiving portion 630 by the optical fiber or a reflection mirror for free space transmission via the optical system 620. The light-receiving portion 630 detects the received light be means of the semiconductor light-receiving element such as a photo detector or the like. The light-receiving portion 630 is capable of controlling the operation of the controller (for example, the start timing of optical transmission) with a control signal 650.

Figure 12:
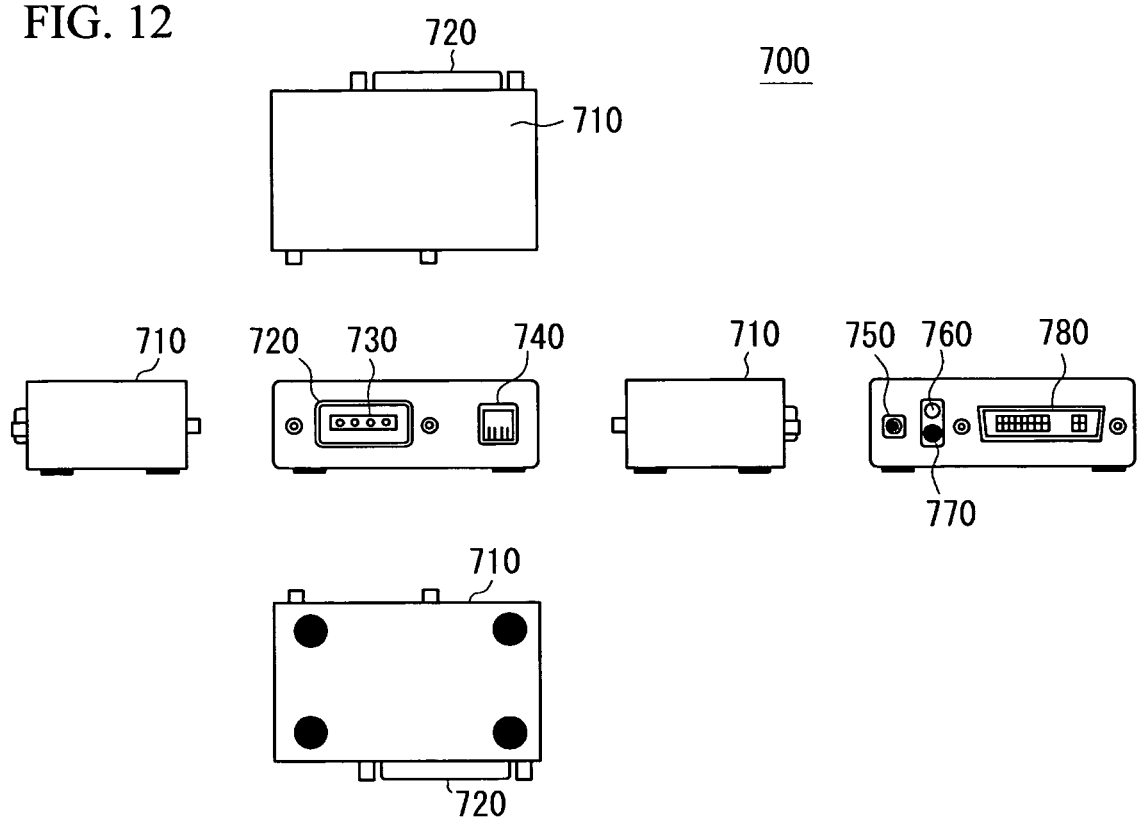
FIG. 12 shows an outer appearance of the optical transmission apparatus.
Figure 13A:
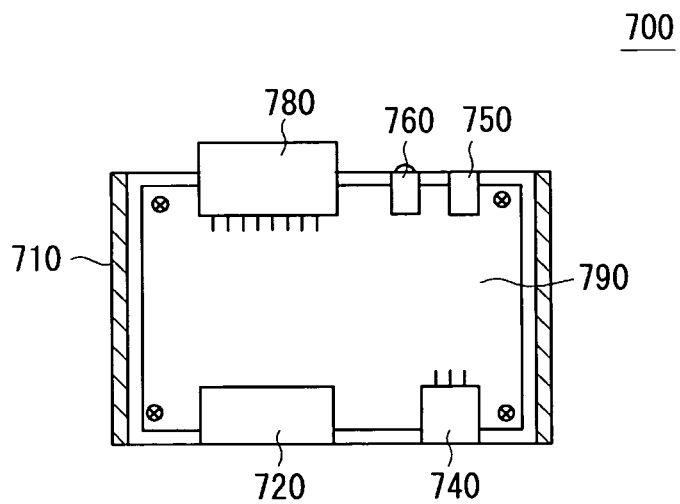
FIG. 13A is a top view of an internal configuration of the optical transmission apparatus.
Figure 13B:
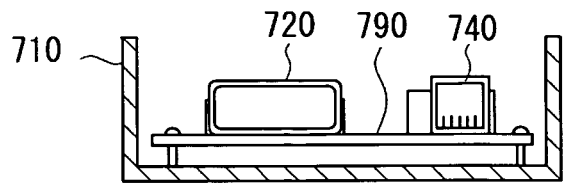
FIG. 13B is a side view of an internal configuration of the optical transmission apparatus.

A description will now be given of an optical transmission apparatus used for the optical transmission system. FIG. 12 shows an outer appearance of the optical transmission apparatus, and FIGS. 13A and 13B show an internal structure thereof. An optical transmission apparatus 700 includes a casing 710, an optical signal transmission/reception connector joint portion 720, a light-emitting/light-receiving element 730, an electric signal cable joint portion 740, a power input portion 750, an LED 760 indicative of in operation, an LED 770 indicative of error, a DVI connector 780 and a transmission circuit board/reception circuit board 790.

Figure 14:
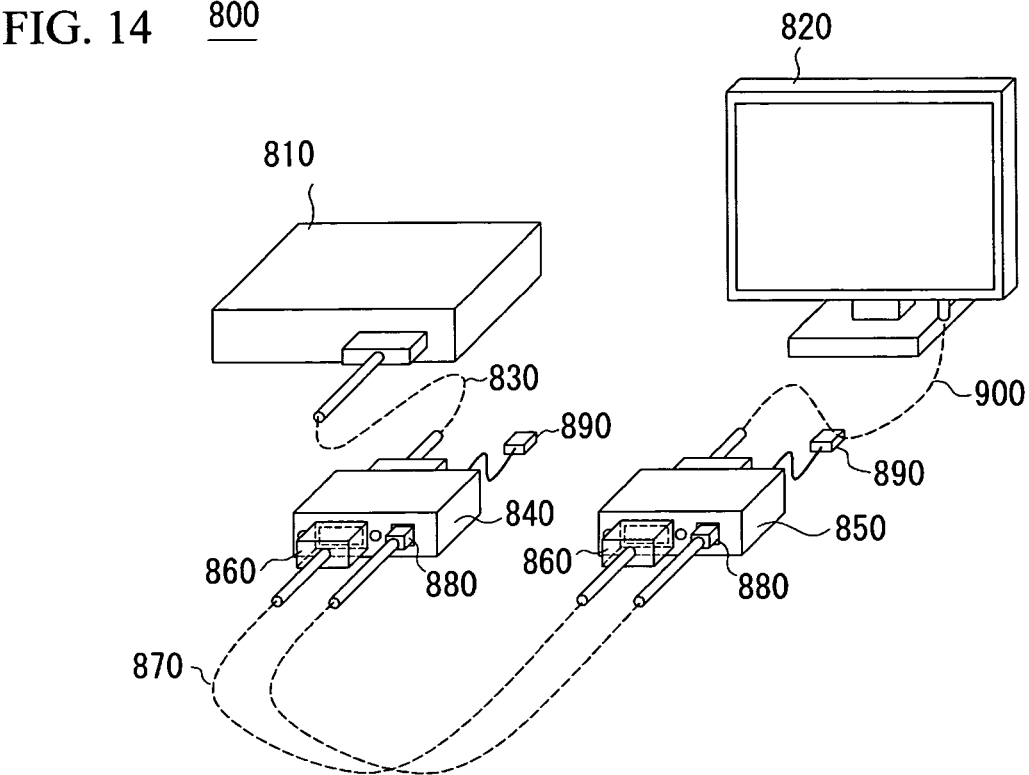
FIG. 14 is a view showing a video transmission system in which the optical transmission apparatus is applied is applied.
Figure 15:
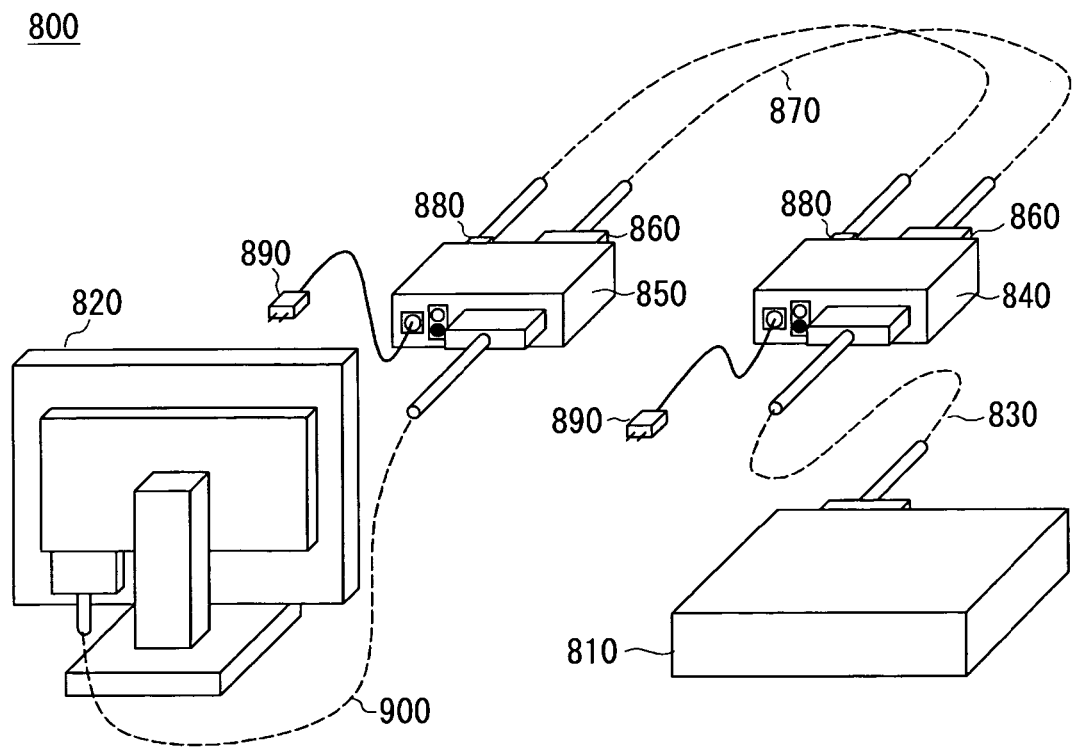
FIG. 15 is a view showing the video transmission system viewing from the backside.
Figure 16:
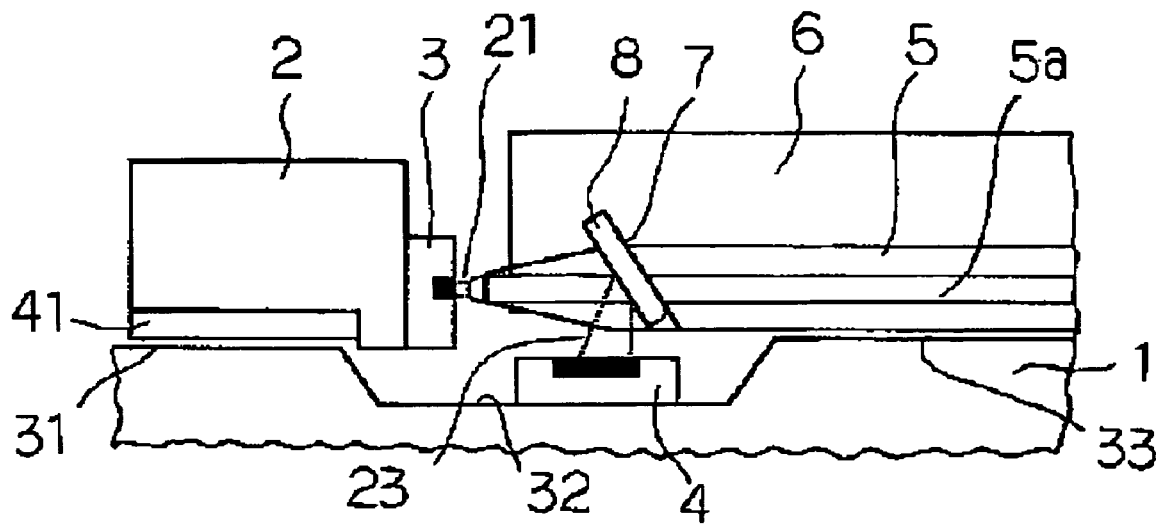
FIG. 16 is a view showing a configuration of a conventional light-emitting module.
Figure 17:
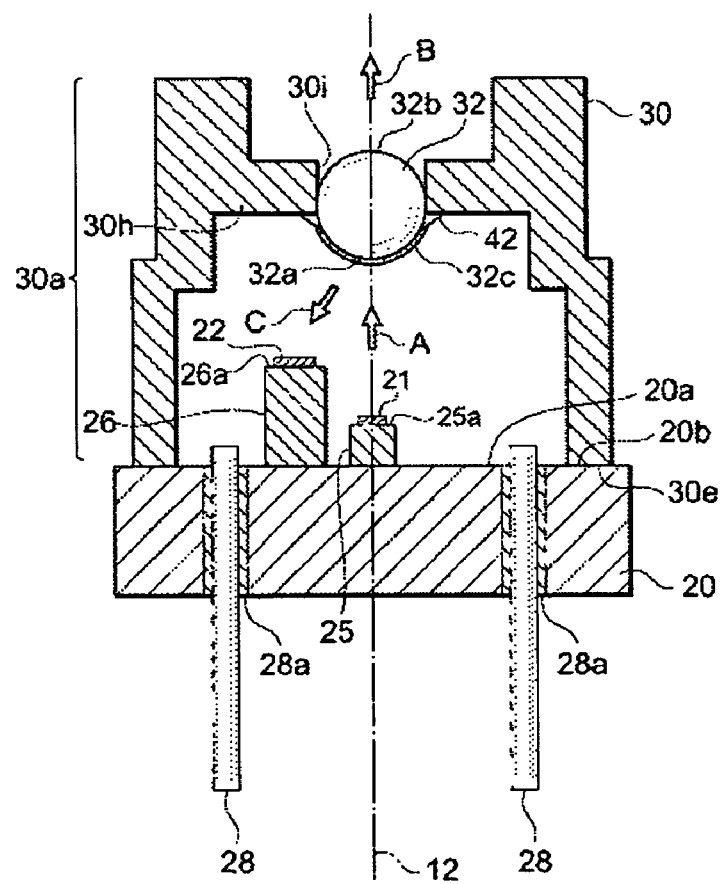
FIG. 17 is a view showing another configuration of a conventional light-emitting module.
Figure 18A:
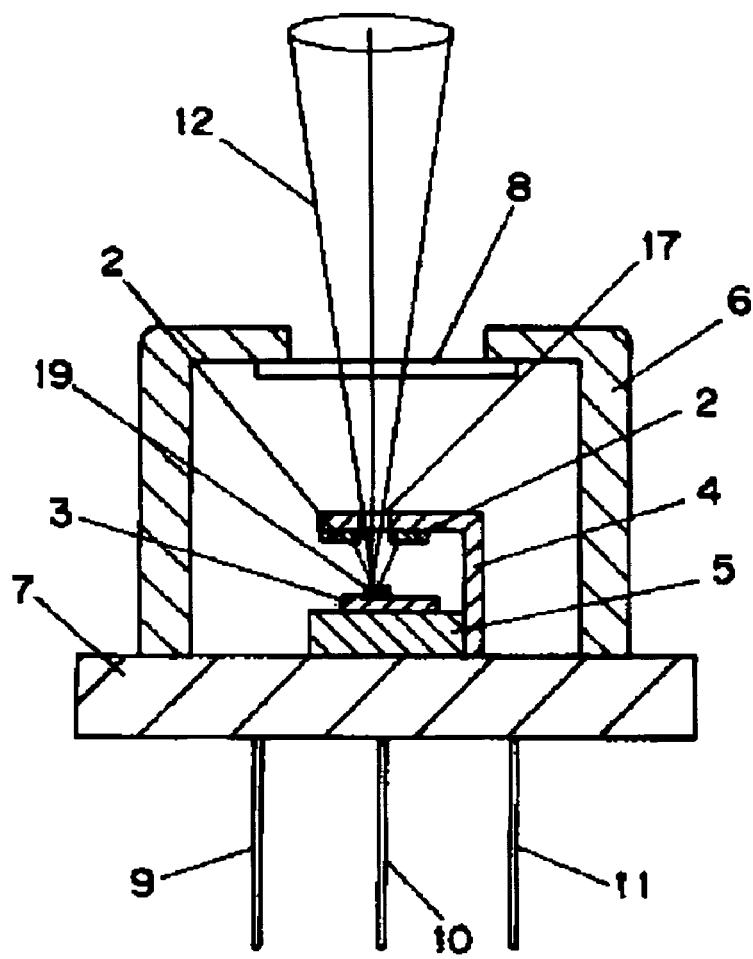
FIGS. 18A and 18B are views showing yet another configuration of the conventional light-emitting module.
Figure 18B:
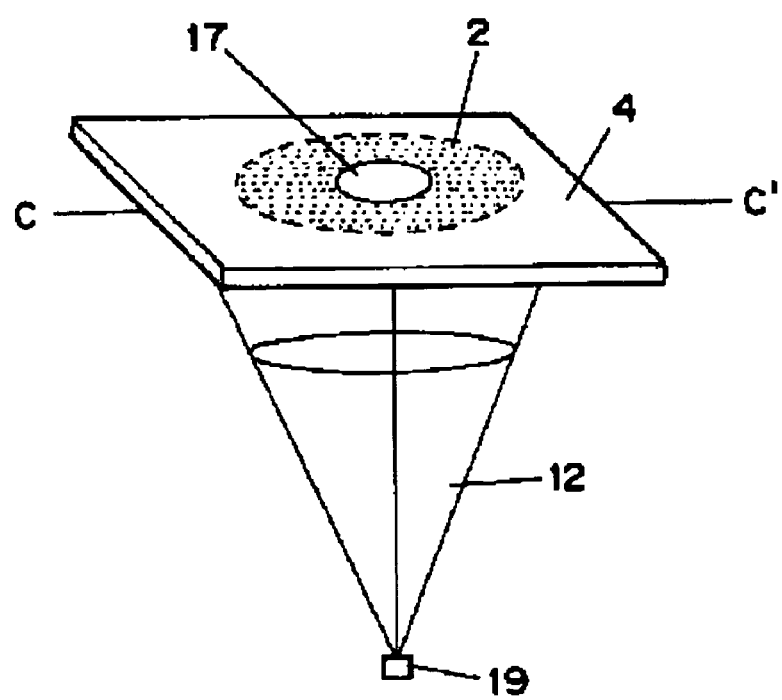

A video transmission system equipped with the optical transmission apparatus 700 is illustrated in FIGS. 14 and 15. Referring to these figures, a video transmission system 800 is equipped with the optical transmission apparatus shown in FIG. 10 for transmitting a video signal generated by a video signal generator 810 to an image display device 820 such as a liquid crystal display. That is to say, the video transmission system 800 includes the video signal generator 810, the image display device 820, a DVI electrical cable 830, a transmission module 840, a reception module 850, an optical connector for video signal transmission, an optical fiber 870, an electrical cable connector 880 for transmission of the video signals, a power adapter 890, and a DVI electrical cable 900.

In the above video transmission system, electric signals are used for transmission between the video signal generator 810 and the transmission module 840, and transmission between the reception module 850 and the image display device 820 by electrical cables 830 and 900. Instead of the electrical cables, optical signals may be employed. For example, signal transmission cables having connectors equipped with an electro-optical converter and an opto-electrical converter may be substituted for the electrical cables 830 and 900.

The semiconductor light-emitting element is, for example, a vertical cavity surface emitting laser diode, and has a post structure of selective oxidation.

According to the light-emitting module in accordance with the present invention, the semiconductor light-receiving element is disposed on the light axis of the lens and the semiconductor light-emitting element is offset from the light axis of the lens. This makes it possible to receive the lights reflected by the lens efficiently with the semiconductor light-receiving element, without increasing the intensity of the laser lights emitted from the semiconductor light-emitting element. Thus, it is possible to monitor the light amount emitted from the semiconductor light-emitting element control the light amount approximately, under the environment where the temperature changes.

In the above-mentioned embodiments, the ball lens is in use for the light-emitting module. However, in addition to the ball lens, an alternate lens may be employed, for example, aspheric lens or another type of lens having a spherical plane. In this case, it is possible to adjust an offset amount the VCSEL chip and the semiconductor light-receiving element in an X-axis direction, as necessary. In addition, the ratios of the distances A:B:C may be changed as necessary. Further, the laser beam having the wavelength of 850 nm is applied as the VCSEL chip, however, an alternate laser element may be used.

The light-emitting module in accordance with the present invention can be used for a light source of the image storage apparatus or the optical communications apparatus or the light source of an image forming apparatus such as a printer or copy machine.

Although a few embodiments of the present invention have been shown and described, it would be appreciated by those skilled in the art that changes may be made in these embodiments without departing from the principles and spirit of the invention, the scope of which is defined in the claims and their equivalents.

The entire disclosure of Japanese Patent Application No. 2005-209400 filed on Jul. 20, 2005 including specification, claims, drawings, and abstract is incorporated herein by reference in its entirety.

What is claimed is:

1. A light-emitting module outputting laser beam emitted from a semiconductor light-emitting element via a lens, the light-emitting module comprising:
a first main plane;
a mount portion on the first main plane that mounts the semiconductor light-emitting element;
a lens holding portion that holds the lens so that a light axis of the lens corresponds to a reference line crossed at right angles to the first main plane;
a semiconductor light-receiving element that receives the laser beam reflected by the lens out of the laser beam emitted from the semiconductor light-emitting element;
wherein the semiconductor light-receiving element is positioned on the light axis of the lens and the semiconductor light-emitting element is provided away from the light axis of the lens such that an intensity of the laser beam emitted from the semiconductor light-emitting element is controlled based on the reflected laser beam received by the semiconductor light-receiving element.

2. The light-emitting module as claimed in claim 1, wherein the semiconductor light-emitting element is deposited adjacently to the semiconductor light-receiving element on the first main plane of the mount portion.

3. The light-emitting module as claimed in claim 1, wherein the lens is a ball lens.

4. The light-emitting module as claimed in claim 3, wherein the semiconductor light-emitting element is provided within a range that does not exceed a radius of the ball lens from the light axis of the ball lens.

5. The light-emitting module as claimed in claim 1, wherein the semiconductor light-receiving element is disposed on a second plane provided for mounting a member, on the first main plane of the mount portion.

6. The light-emitting module as claimed in claim 5, wherein a distance from the first main plane to a light-receiving plane of the semiconductor light-receiving element is greater than that from the first main plane to a light-emitting plane of the semiconductor light-emitting element.

7. The light-emitting module as claimed in claim 1, wherein the lens is capable of partially reflecting and partially transmitting the laser beam emitted from the semiconductor light-emitting element.

8. The light-emitting module as claimed in claim 7, wherein a relationship of approximately A:B:C=7:7.5:2 is satisfied, where A is a distance from a lowermost face of the ball lens, B is a radius of the ball lens, and C is another distance from a center of a luminous point of the semiconductor light-emitting element.

9. The light-emitting module as claimed in claim 1, wherein the semiconductor light-emitting element has a light-emitting profile showing a peak intensity at an angle tilted from the light axis of the lens.

10. The light-emitting module as claimed in claim 1, wherein the semiconductor light-emitting element emits a multimode light.

11. The light-emitting module as claimed in claim 1, wherein the semiconductor light-emitting element is a vertical cavity surface emitting laser diode.

12. An optical transmission apparatus comprising:
a light-emitting module; and
a transmission portion that transmits laser beam output from the light-emitting module through an optical fiber,
the light-emitting module outputting the laser beam emitted from a semiconductor light-emitting element via a lens, the light-emitting module including:
a first main plane;
a mount portion on the first main plane that mounts the semiconductor light-emitting element;
a lens holding portion that holds the lens so that a light axis of the lens corresponds to a reference line crossed at right angles to the first main plane;
a semiconductor light-receiving element that receives the laser beam reflected by the lens out of the laser beam emitted from the semiconductor light-emitting element;
wherein the semiconductor light-receiving element is positioned on the light axis of the lens and the semiconductor light-emitting element is provided away from the light axis of the lens such that an intensity of the laser beam emitted from the semiconductor light-emitting element is controlled based on the reflected laser beam received by the semiconductor light-receiving element.

13. The optical transmission apparatus as claimed in claim 12, a light axis of the optical fiber is not aligned to that of the lens.

14. The optical transmission apparatus as claimed in claim 13, the light axis of the optical fiber corresponds to a given angle showing a peak intensity of the semiconductor light-emitting element.

15. The optical transmission apparatus as claimed in claim 12, further comprising a drive control portion that controls an output from the semiconductor light-emitting element on the basis of the output from the semiconductor light-receiving element.

16. A free space optical transmission apparatus comprising:
a light-emitting module; and
a transmission portion that transmits laser beam transmitted from the light-emitting module through free space,
the light-emitting module outputting the laser beam emitted from a semiconductor light-emitting element via a lens, the light-emitting module including:
a first main plane;
a mount portion on the first main plane that mounts the semiconductor light-emitting element;
a lens holding portion that holds the lens so that a light axis of the lens corresponds to a reference line crossed at right angles to the first main plane;
a semiconductor light-receiving element that receives the laser beam reflected by the lens out of the laser beam emitted from the semiconductor light-emitting element;
wherein the semiconductor light-receiving element is positioned on the light axis of the lens and the semiconductor light-emitting element is provided away from the light axis of the lens such that an intensity of the laser beam emitted from the semiconductor light-emitting element is controlled based on the reflected laser beam received by the semiconductor light-receiving element.

17. An optical transmission system comprising:
a light-emitting module; and
a transmission portion that transmits laser beam transmitted from the light-emitting module,
the light-emitting module outputting the laser beam emitted from a semiconductor light-emitting element via a lens, the light-emitting module including:
a first main plane;
a mount portion on the first main plane that mounts the semiconductor light-emitting element;
a lens holding portion that holds the lens so that a light axis of the lens corresponds to a reference line crossed at right angles to the first main plane;
a semiconductor light-receiving element that receives the laser beam reflected by the lens out of the laser beam emitted from the semiconductor light-emitting element;
wherein the semiconductor light-receiving element is positioned on the light axis of the lens and the semiconductor light-emitting element is provided away from the light axis of the lens such that an intensity of the laser beam emitted from the semiconductor light-emitting element is controlled based on the reflected laser beam received by the semiconductor light-receiving element.

18. A free space optical transmission system comprising:
a light-emitting module; and
a transmission portion that transmits laser beam transmitted from the light-emitting module through free space,
the light-emitting module outputting the laser beam emitted from a semiconductor light-emitting element via a lens, the light-emitting module including:
a first main plane;
a mount portion on the first main plane that mounts the semiconductor light-emitting element;
a lens holding portion that holds the lens so that a light axis of the lens corresponds to a reference line crossed at right angles to the first main plane;
a semiconductor light-receiving element that receives the laser beam reflected by the lens out of the laser beam emitted from the semiconductor light-emitting element;
wherein the semiconductor light-receiving element is positioned on the light axis of the lens and the semiconductor light-emitting element is provided away from the light axis of the lens such that an intensity of the laser beam emitted from the semiconductor light-emitting element is controlled based on the reflected laser beam received by the semiconductor light-receiving element.

* * * * *